United States Patent [19]

Graham

[11] 4,453,624
[45] Jun. 12, 1984

[54] HANDWHEEL CLUTCH FOR SEWING MACHINES

[75] Inventor: Thomas G. Graham, Emerson, N.J.

[73] Assignee: The Singer Company, Stamford, Conn.

[21] Appl. No.: 383,667

[22] Filed: Jun. 1, 1982

[51] Int. Cl.³ ............................................. F16D 11/00
[52] U.S. Cl. ........................... 192/67 R; 192/95; 192/114 R; 112/220
[58] Field of Search ............... 192/67 P, 67 R, 95, 192/114 R; 112/220, 279

[56] References Cited

U.S. PATENT DOCUMENTS

| 211,411 | 1/1879 | Lament . | |
|---|---|---|---|
| 241,180 | 5/1881 | Barker . | |
| 575,620 | 1/1887 | Seymour | 192/67 R |
| 1,355,659 | 10/1920 | Evslin | 192/114 R |
| 2,632,540 | 10/1950 | Smith | 192/67 R |
| 2,663,396 | 12/1953 | Wagner | 192/67 R |
| 2,858,785 | 11/1958 | Kuhar | 112/220 |
| 3,005,528 | 10/1961 | Doble et al. | 192/67 R |
| 3,224,398 | 12/1965 | Greulich | 192/67 R |
| 3,606,800 | 4/1970 | Treff et al. | 192/67 R X |
| 3,869,030 | 3/1975 | Masaki . | |

FOREIGN PATENT DOCUMENTS 5243953  9/1975  Japan .

Primary Examiner—Rodney H. Bonck
Assistant Examiner—James J. Merek
Attorney, Agent, or Firm—Edward P. Schmidt; Robert E. Smith; Edward L. Bell

[57] ABSTRACT

A clutch element fastened to the end of a sewing machine main shaft by a shouldered screw is slidable thereon to a first position wherein axially extending clutch fingers thereof extend through guide notches in an interlock element fixed to the main shaft by the shouldered screw, into axially aligned recesses in a belt driven handwheel so as to drive the sewing machine main shaft. In a second position of the clutch element, the axially extending fingers thereof are withdrawn from the recesses in the handwheel so that the sewing machine main shaft is not driven. Detent means are provided to maintain the clutch element in a selected position.

5 Claims, 3 Drawing Figures

U.S. Patent    Jun. 12, 1984    4,453,624
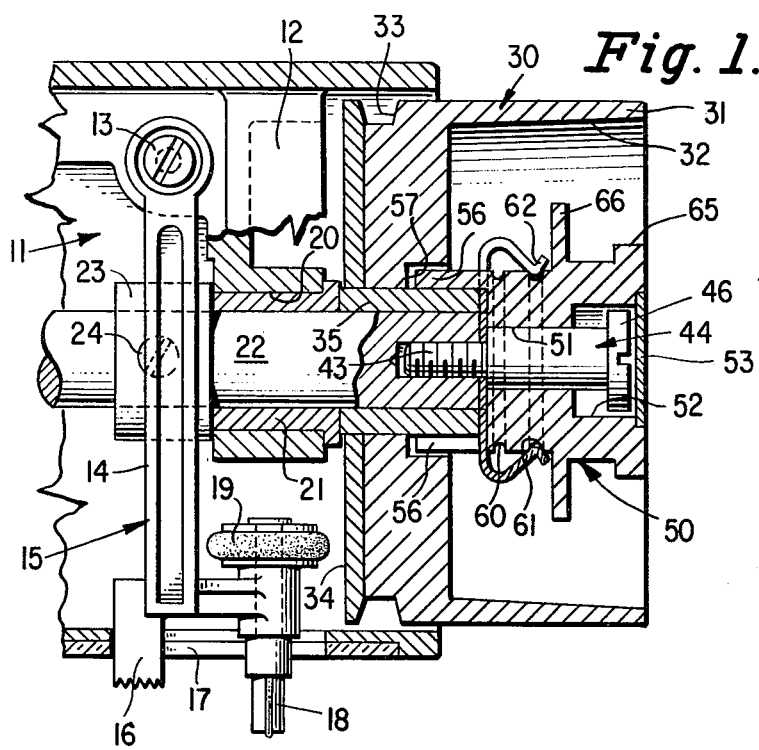
Fig. 1.
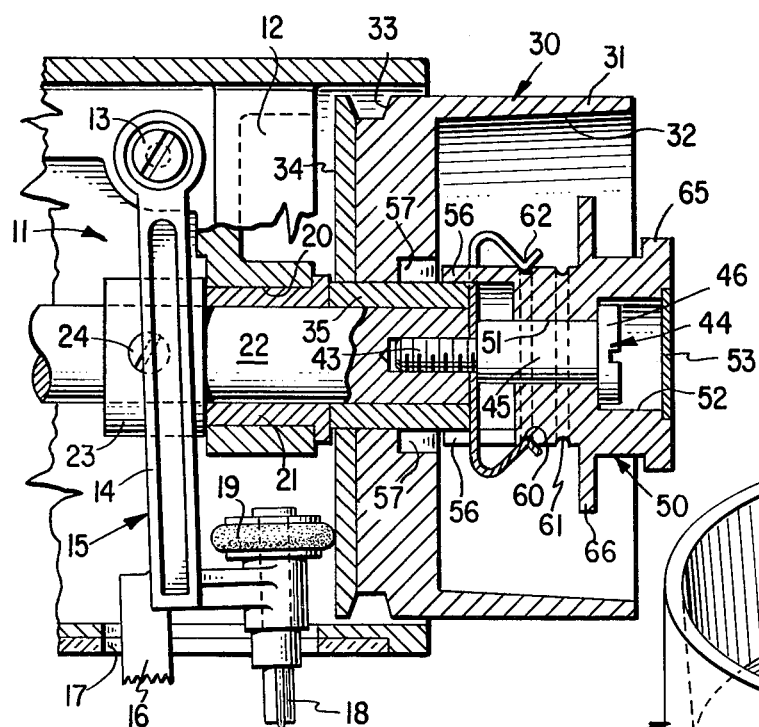
Fig. 2.
Fig. 3.
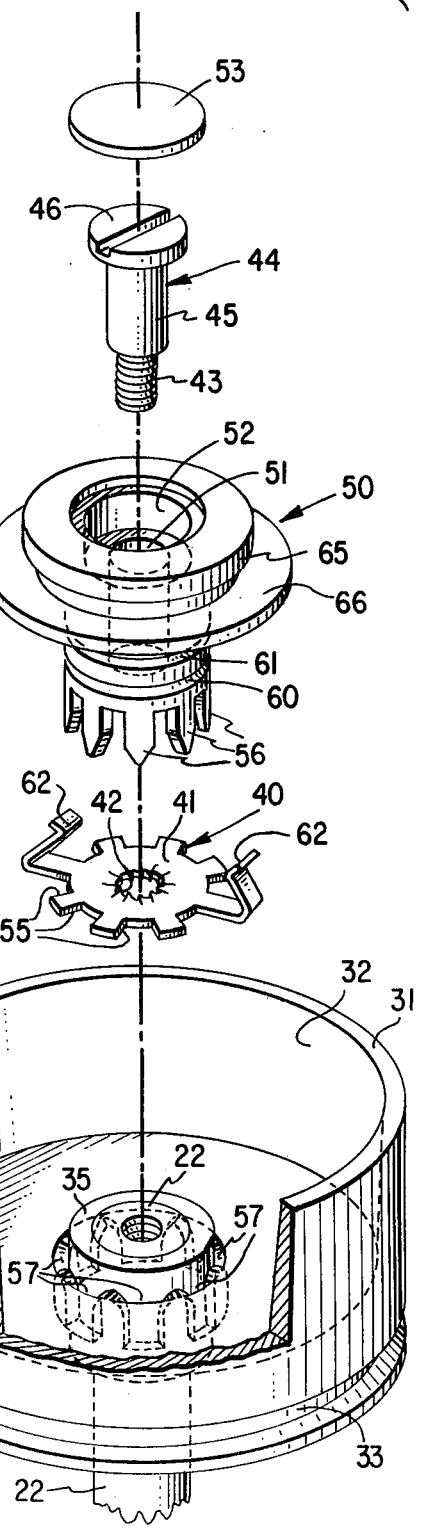

HANDWHEEL CLUTCH FOR SEWING MACHINES

BACKGROUND OF THE INVENTION

This invention relates to handwheel clutches for sewing machines, and more particularly, to a cost effective operator influenced clutch device which may be operated quickly by a single motion.

Handwheel clutches for sewing machines which have been known heretofore have involved tedious time consuming manipulation such as the screwing or unscrewing of a threaded clamp or they have involved costly and complicated construction.

Such handwheel clutches are used selectively to engage or disengage the driven pulley or handwheel of a sewing machine from the main drive shaft thereof and serve, for instance, to interrupt the drive to the stitch forming instrumentalities of the sewing machine while the bobbin winder is being used to wind a fresh supply of thread on a bobbin. A sewing machine operator may thus leave work fabric in place in the sewing machine while directing her attention to winding thread on a bobbin without concern with adverse influence of the stitch forming instrumentalities on the work being sewn.

SUMMARY OF THE INVENTION

It is an object of this invention to provide a sewing machine handweel clutch which is simple and effective in operation, requiring only a single operator influenced motion to effect engagement or disengagement of the clutch and which is attained by a simple construction involving a minimum of readily manufacturable parts.

A belt driven handwheel freely rotatable on the sewing machine main shaft is fashioned with circumferentially spaced axially aligned recesses. A sheet metal interlock element is fixed to the end of the main shaft by a shouldered screw, and is formed with guide notches aligned with and axially spaced from the recesses in the handwheel. A clutch element is carried axially slidable on the shoulder of the shouldered screw and fashioned with clutch fingers which extend in a first position through the guide notches and into the recesses of the handwheel; and in a second position the clutch fingers are removed from engagement with the handwheel recesses so as not to transfer rotation of the belt driven handwheel to the sewing machine main shaft.

DESCRIPTION OF THE DRAWINGS

With the above and additional objects and advantages in view as will hereinafter appear, this invention will be described with reference to a preferred embodiment illustrated in the accompanying drawing in which:

FIG. 1 is a horizontal cross-sectional view of a portion of a sewing machine showing the handwheel clutch of this invention in the engaged position drivingly connecting the handwheel to the sewing machine main shaft;

FIG. 2 is a horizontal cross-sectional view similar to that of FIG. 1 but showing the handwheel clutch disengaged and the bobbin winder in an operative position; and, FIG. 3 is an exploded perspective view of the elements of the handwheel clutch of this invention.

DETAILED DESCRIPTION OF THE INVENTION

Referring to FIGS. 1 and 2 of the drawings, 11 indicates a portion of the frame of a sewing machine within which a web 12 is provided which accommodates a pivot pin 13 on which is mounted the arm 14 of a conventional bobbin winder indicated generally at 15. At its free extremity, the bobbin winder arm 14 is formed with a finger grip 16 protruding through a slot 17 in the frame of the sewing machine, and it also carries a bobbin accommodating spindle 18 extending through the frame slot 17 and having a friction wheel secured thereto within the frame for driving engagement with a handwheel to be described hereinbelow.

The frame web 12 is also formed with bore 20 accommodating a flanged bushing 21 in which a main shaft 22 of the sewing machine is journalled. A collar 23 secured to the main shaft as by a set screw 24 serves to constrain the main shaft axially in one direction in the sewing machine frame. Similar constraint for the main shaft in the opposite axial direction may be provided elsewhere in the machine frame and is not shown in the accompanying drawing.

A handwheel 30, preferrably formed of molded plastic material, is provided on the main shaft 22. The handwheel 30 may be fabricated of several portions adhesively or otherwise secured on assembled relation and including a main portion 31 formed on one side with a large axial recess 32 and at the other side with a portion of belt pulley groove 33. The remaining portion of the belt pulley groove 33 is formed by disc shaped auxiliary portion 34 of the handwheel fastened to the main handwheel portion 31 by any suitable means. The handwheel 30 is rotationally interlocked with a bearing bushing 35 as by being molded onto an exterior knurled section of the bushing 35 or by any other appropriate fastening means.

The handwheel 30 is freely rotatable on the main shaft 22, the bearing bushing 35 being axially constrained between the flanged bushing 21 and an interlock element indicated generally at 40 which is arranged at the extremity of the main shaft 22. The interlock element 40 includes a substantially planar disk like portion 41 formed with a central aperture 42 adapted to accommodate the threaded portion 43 of a shouldered screw 44 which is treaded axially into the extremity of the main shaft. An enlarged cylindrical shoulder portion 45 of a shouldered screw 44 in addition to clamping the interlock element 40 against the extremity of the main shaft, provides axially slidable support for a clutch element 50 which has a bore 51 embracing the shoulder 45 and an enlarged counterbore 52 accommodating the head 46 of the shoulder screw 44. The counterbore 52 may be closed by a trim disc 53 for cosmetic reasons.

To connect the interlock element 40 rotationally with the main shaft 22, the disk 41 about the central aperture 42 is formed with teeth which are offset laterally toward the main shaft extremity which teeth are preferrably inclined in the direction counter to that of the direction of rotation of the main shaft 22.

Radially beyond the main shaft 22 and the bearing bushing 35, the planar disc-like portion 41 of the interlock element 40 is formed with a plurality of evenly spaced radial guide notches 55 each of which slidably accommodates a clutch finger 56 which protrudes axially from the clutch element 50 toward the handwheel 30. The handwheel within the large recess 32 is formed with a plurality of evenly spaced axial recesses 57 complemental to the clutch fingers 56, the clutch fingers 56 and recesses 57 providing interengageable clutch surfaces which are selectively engageable upon axial shift of the clutch element with respect to the main shaft 22.

Preferably, the free extremity of each clutch finger is tapered as shown in FIG. 3; and, also as shown in FIG. 3, each of the recesses 57 is flared to facilitate registry of the clutch surfaces whenever they are moved into engagement.

Since the interlock element 40 is secured rotationally to the main shaft, engagement of the clutch fingers 56 in the guide notches 55 of the interlock element 40 also secures the clutch element 50 rotationally to the main shaft. The length of the cylindrical shoulder 45 of the screw 44 is sufficient to provide for axial movement of the clutch element 50 sufficient to permit selective engagement of the clutch surfaces 56, 57 which, when engaged lock the handwheel 30 rotationally to the main shaft 22, and when disengaged, free the handwheel for rotation independently of the main shaft.

To provide for retention of the clutch element 50 in either the engaged or disengaged position of the clutch, a pair of annular detent notches 60, 61 are formed exteriorly of the clutch element for cooperative engagement with spring fingers 62—62 which extend diametrically from the interlock element 40 between adjacent guide notches 55 therein.

Preferably, the clutch element 50 is contained substantially within the large recess 32 of the handwheel 30; and to facilitate manipulation of the clutch element, a radially enlarged lip 65 may be formed thereon. Inwardly of the lip 65, the clutch element 50 may be formed with a radially extending guard flange 66 to protect a sewing machine operator's finger tips from inadvertent contact with the interlock element when the main shaft 22 is being driven.

The clutch construction of this invention thus provides for selective clutch engagement simply by a single axial movement of the clutch element 50.

Since the interlock element 40 serves the multiple functions of constraining the handwheel axially on the main shaft, rotationally securing itself and the clutch element 50 to the main shaft and retaining the clutch element either in engaged or disengaged position of the clutch the present invention provides a particularly advantageous cost effective sewing machine handwheel clutch.

I claim:

1. In a sewing machine having a main shaft, a driven wheel freely journalled relatively to said main shaft, operator influenced clutch means for selectively drivingly engaging or disengaging said driven wheel and said main shaft, said clutch means comprising:
    a clutch element shiftably supported for sliding movement axially of said main shaft,
    complemental axially engageable clutch surfaces formed on said clutch element and on said driven wheel, detents formed on said clutch element spaced apart axially of said main shaft,
    and an interlock element formed with surfaces adapted to interlock rotationally with said main shaft, guide surfaces on said interlock element slidably accommodating said clutch element in rotationally interlocked relation with said main shaft, and a spring finger on said interlock element cooperatively related with said clutch element detents to locate said clutch element selectively into or out of an axial position of engagement of said complemental clutch surfaces.

2. An operator influenced clutch means as set forth in claim 1 in which said clutch element is shiftably supported for sliding movement axially of said main shaft on a shouldered screw threaded axially into an extremity of said main shaft, in which said interlock element is sustained on said main shaft extremity by said shouldered screw.

3. An operator influnced clutch means as set forth in claim 2 in which means including a radial flange is carried on said main shaft limiting axial movement of said driven wheel axially away from said free extremity of the main shaft and in which said interlock element provides radially beyond said main shaft at the free extremity thereof to limit axial movement of said driven wheel toward said free extremity of the main shaft.

4. An operator influenced clutch means as set forth in claim 2 in which said surfaces on said interlock element adapted to interlock rotationally with said main shaft comprise teeth offset from said interlock element and forced against said main shaft extremity by said shouldered screw.

5. An operator influenced clutch means as set forth in claim 1 in which said complemental axially engageable clutch surfaces include axially extending clutch fingers extending from said clutch element in evenly spaced relationship around said main shaft and recesses formed in said driven wheel complemental to said clutch fingers, and in which said interlock element comprises an annular washer on which said guide surfaces are provided by radial notches slidably accommodating said clutch fingers.

* * * * *